(12) United States Patent
Li

(10) Patent No.: US 9,046,340 B2
(45) Date of Patent: Jun. 2, 2015

(54) LENGTH DUAL MEASURING DEVICE

(71) Applicant: Yu-Cheng Li, Taichung (TW)

(72) Inventor: Yu-Cheng Li, Taichung (TW)

(73) Assignee: Precaster Enterprises Co., Ltd., Taichung (TW)

( * ) Notice: Subject to any disclaimer, the term of this patent is extended or adjusted under 35 U.S.C. 154(b) by 173 days.

(21) Appl. No.: 13/875,286

(22) Filed: May 2, 2013

(65) Prior Publication Data

US 2014/0090264 A1  Apr. 3, 2014

(30) Foreign Application Priority Data

Sep. 28, 2012  (TW) .............................. 101218802 U

(51) Int. Cl.
| | |
|---|---|
| *G01B 3/10* | (2006.01) |
| *G01C 3/08* | (2006.01) |
| *G01S 17/88* | (2006.01) |
| *G01S 17/10* | (2006.01) |

(52) U.S. Cl.
CPC . *G01B 3/10* (2013.01); *G01S 17/88* (2013.01); *G01B 2003/1092* (2013.01); *G01S 17/10* (2013.01); *G01C 3/08* (2013.01)

(58) Field of Classification Search
CPC ..... G01B 2003/1092; G01B 3/10; G01C 3/08
USPC .................................. 33/760, 755, 768, 770
See application file for complete search history.

(56) References Cited

U.S. PATENT DOCUMENTS

| | | | | |
|---|---|---|---|---|
| 5,020,235 | A | * | 6/1991 | Martin ............................ 33/668 |
| 5,060,393 | A | * | 10/1991 | Silverman et al. .............. 33/512 |
| 5,182,863 | A | * | 2/1993 | Rando ............................. 33/227 |
| 6,073,352 | A | * | 6/2000 | Zykan et al. .................... 33/265 |
| 6,928,029 | B2 | * | 8/2005 | Rickman ......................... 367/99 |
| 2002/0059735 | A1 | * | 5/2002 | Ponce ............................. 33/760 |
| 2005/0150126 | A1 | * | 7/2005 | Marshall et al. ................ 33/760 |
| 2007/0101600 | A1 | * | 5/2007 | Alders ............................ 33/760 |
| 2007/0107248 | A1 | * | 5/2007 | Jones ............................. 33/760 |
| 2008/0235975 | A1 | * | 10/2008 | Chang ............................ 33/760 |
| 2013/0047455 | A1 | * | 2/2013 | Steele et al. .................... 33/761 |

\* cited by examiner

*Primary Examiner* — Christopher Fulton

(57) ABSTRACT

A measuring device includes a laser rangefinder, a retractable tape measure and a connecting assembly. The laser rangefinder is configured to transmit a light pulse to a target and receive a reflected light pulse from the target for measuring the distance between the rangefinder and the target. The tape measure has a housing and a flexible measuring tape enclosed in the housing. The housing defines a tape outlet opening from which the measuring tape is movable from a retracted position to an extended position. The connecting assembly is disposed at the junction between the laser rangefinder and the tape measure to have the laser rangefinder and the tape measure be detachably mounted together.

5 Claims, 6 Drawing Sheets

LENGTH DUAL MEASURING DEVICE

BACKGROUND OF THE INVENTION

1. Field of the Invention

The present invention relates to a portable length measuring device and more particularly to a dual measuring device integrated with a laser rangefinder and a tape measure.

2. Description of the Related Art

A tape measure is a common measuring tool that allows for a measure of great length to be easily carried in pocket or toolkit and permits one to measure around curves or corners. However, measuring in lengths of over two or three meters with the tape measure can be difficult due to the flexibility of a measuring tape of the tape measure. If the measuring tape is extended over a specific length in a line, the tape may be bent or curved and hard to maintain straight by itself. One would need another person to hold the tape at a far position and a clear line straight to stretch the tape. This makes it inconvenient and inaccurate.

As an alternative to the tape measure, a laser rangefinder is a device which uses a laser beam to determine the distance to an object. The most common form of laser rangefinder operates on the time of flight principle by sending a laser pulse in a narrow beam towards the object and measuring the time taken by the pulse to be reflected off the target and returned to the sender. With a laser rangefinder, this same job for measuring a long distance can be completed by one operator with just a line of sight. Laser rangefinders typically include the ability to produce some simple calculations, such as the area or volume of a room, as well as switch between imperial and metric units. However, most of the laser rangefinders are designed merely for measuring a long distance and in any case a target is needed. Thus, where there is no targets and a short distance is to be measured, the tape measure turns out to be a better choice than the laser rangefinder. To handle all situations, one would need to bring both the tape measure and the laser rangefinder, and it would be quite inconvenient.

SUMMARY OF THE INVENTION

The present invention provides a length dual measuring device to solve the problems mentioned above. In particular, the dual measuring device is equipped with a laser rangefinder and a tape measure and is convenient to be used and carried.

Specifically, the measuring device includes a laser rangefinder, a retractable tape measure and a connecting assembly. The laser rangefinder is configured to transmit a light pulse to a target and receive a reflected light pulse from the target for measuring the distance between the rangefinder and the target. The tape measure includes a housing and a flexible measuring tape enclosed in the housing. The housing defines a tape outlet opening from which the measuring tape is movable from a retracted position to an extended position. The connecting assembly is disposed at the junction between the laser rangefinder and the tape measure to have the laser rangefinder and the tape measure be detachably mounted together.

Preferably, the laser rangefinder has a gun-shaped casing having a horizontal section and a vertical section extending from the horizontal section. The horizontal section defines a muzzle from which the light pulse of the laser rangefinder is transmitted out to the target. The vertical section defines a battery receptacle therein for reception of a battery. And, the tape measure is removably fitted in a space defined by the horizontal section and the vertical section of the casing of the laser rangefinder. The integrated dual measuring tool remains compact and easy to be carried. Another benefit is that, if the tape measure is broken or cannot function well, the old tape measure can be easily detached from the laser rangefinder and be replaced by a new one.

Further benefits and advantages of the present invention will become apparent after a careful reading of the detailed description with appropriate reference to the accompanying drawings.

BRIEF DESCRIPTION OF THE DRAWINGS

A length dual measuring device according to the invention will now be described, by way of example, with reference to the accompanying drawings, in which.

DETAILED DESCRIPTION OF PREFERRED EMBODIMENT

Referring to FIGS. 1-4, a length dual measuring device is provided in accordance with the preferred embodiment of the present invention. The dual measuring device includes a laser rangefinder 10, a retractable tape measure 20 and a connecting assembly 30 (see FIG. 2).

Figure 2:
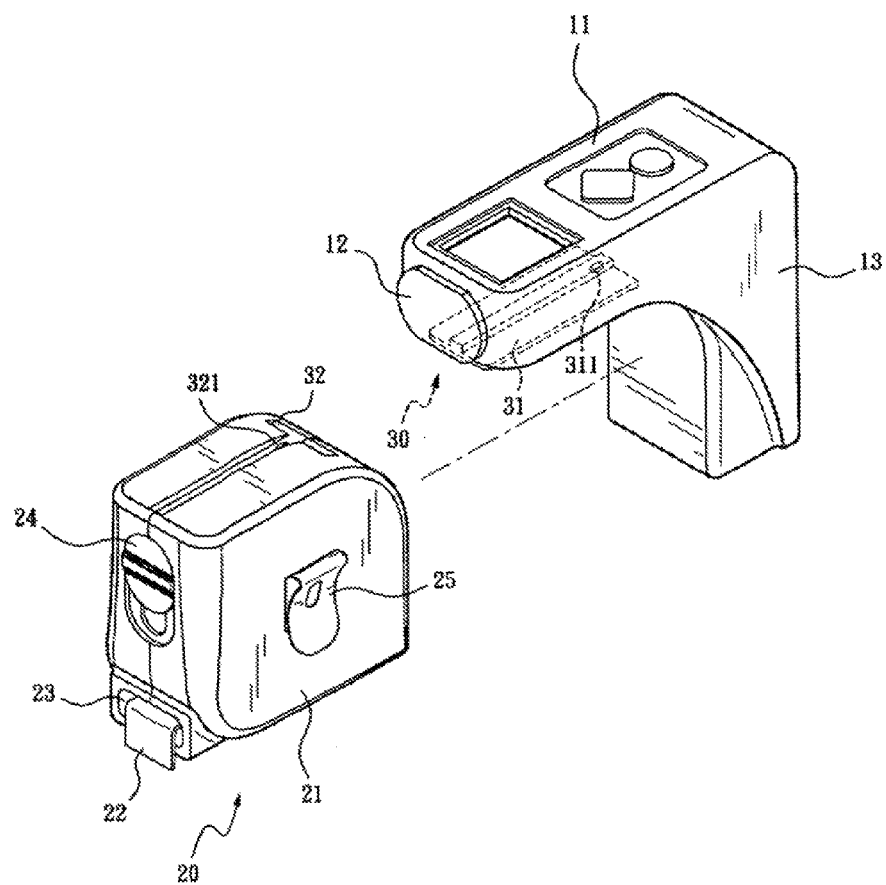
FIG. 2 is an exploded perspective view of the dual measuring device shown in FIG. 1, showing a laser rangefinder and a separate tape measure.
Figure 3:
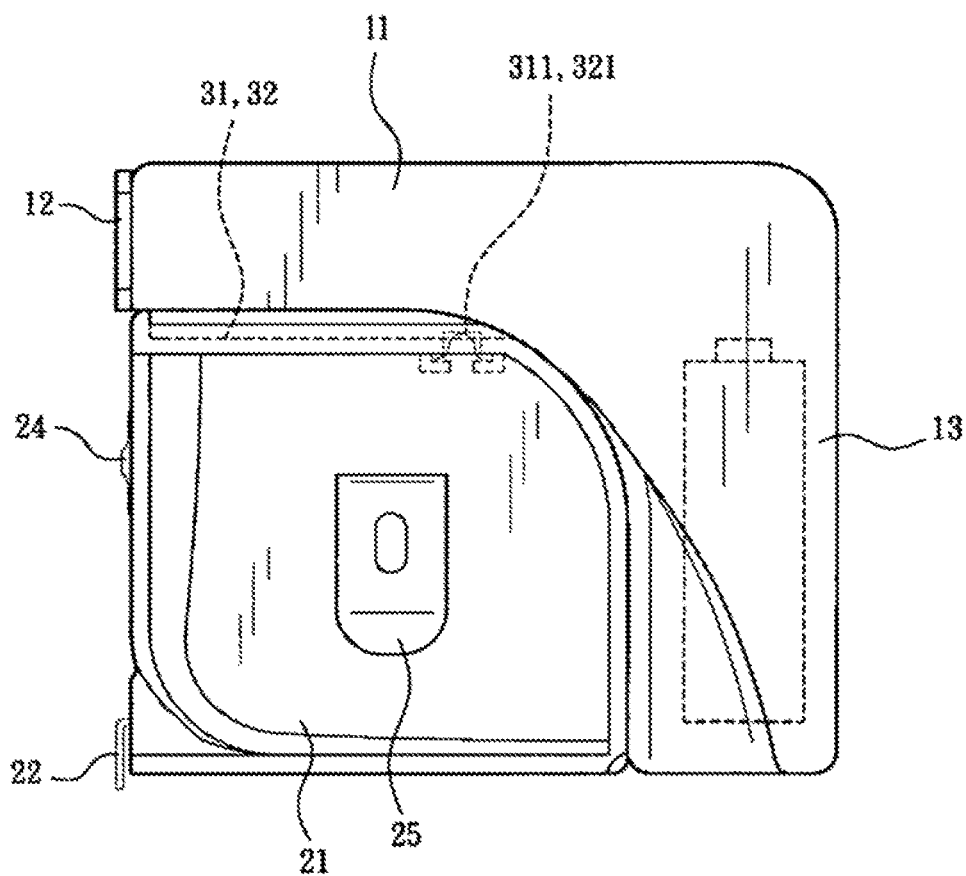
FIG. 3 is a side view of the dual measuring device shown in FIG. 1.
Figure 4:
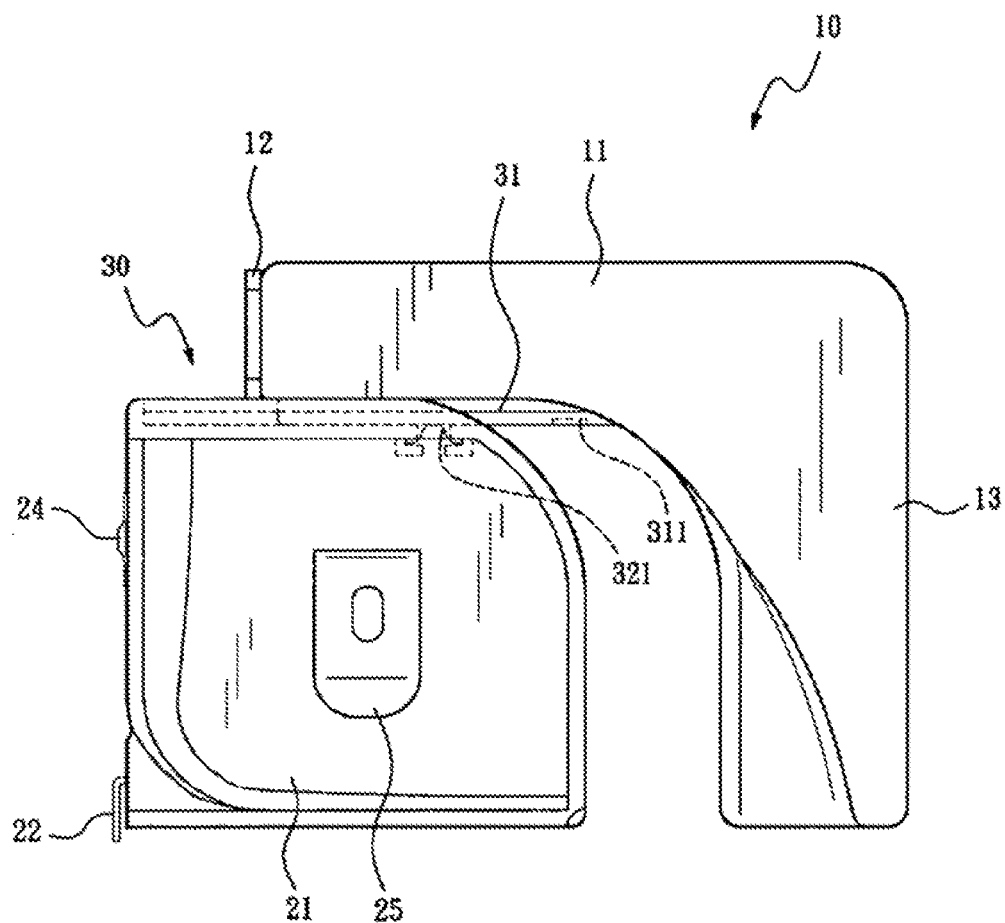
FIG. 4 is a view similar to that of FIG. 3 but with the tape measure operated to be removed from the laser rangefinder.
Figure 5:
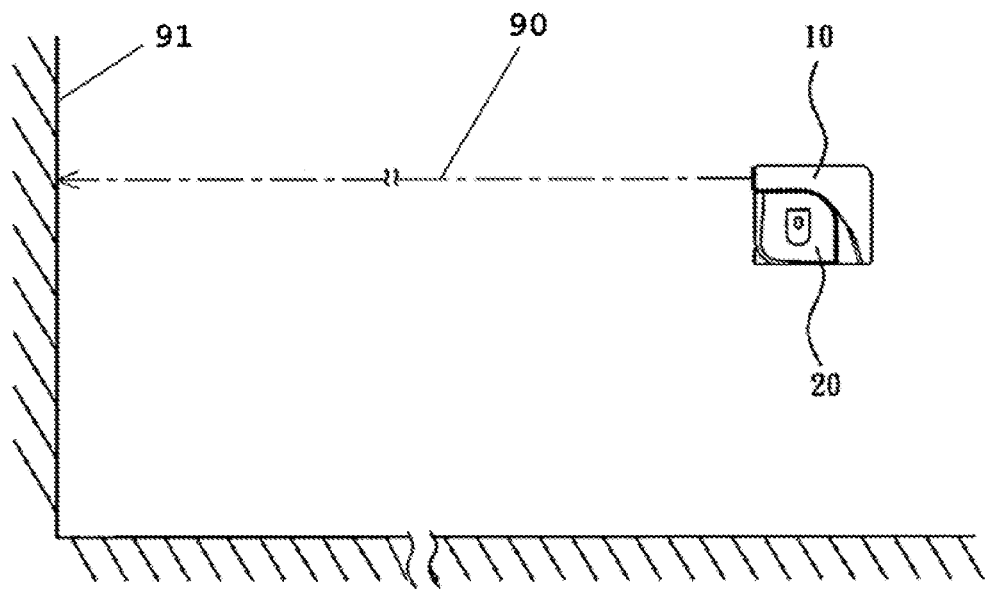
FIG. 5 illustrates a situation where the laser rangefinder of the dual measuring device is in use.

As shown in FIG. 5 as well as FIG. 2, the laser rangefinder 10 is configured to transmit a light pulse 90 to a target 91 and receive a reflected light pulse from the target 91 for measuring the distance between the laser rangefinder 10 and the target 91. Specifically, the laser rangefinder 10 includes a gun-shaped casing having a horizontal section 11 and a vertical section 13 extending from the horizontal section 11. The horizontal section 11 defines at its end a muzzle 12 from which the light pulse 90 of the laser rangefinder 10 is transmitted out to the target 91. A space is defined by the horizontal section 11 and the vertical section 13 of the casing of the laser rangefinder 10 to receive the tape measure 20. Moreover, as shown in FIG. 3, the vertical section 13 defines a battery receptacle therein for reception of a battery. The battery is provided to power the laser rangefinder 10.

Figure 1:
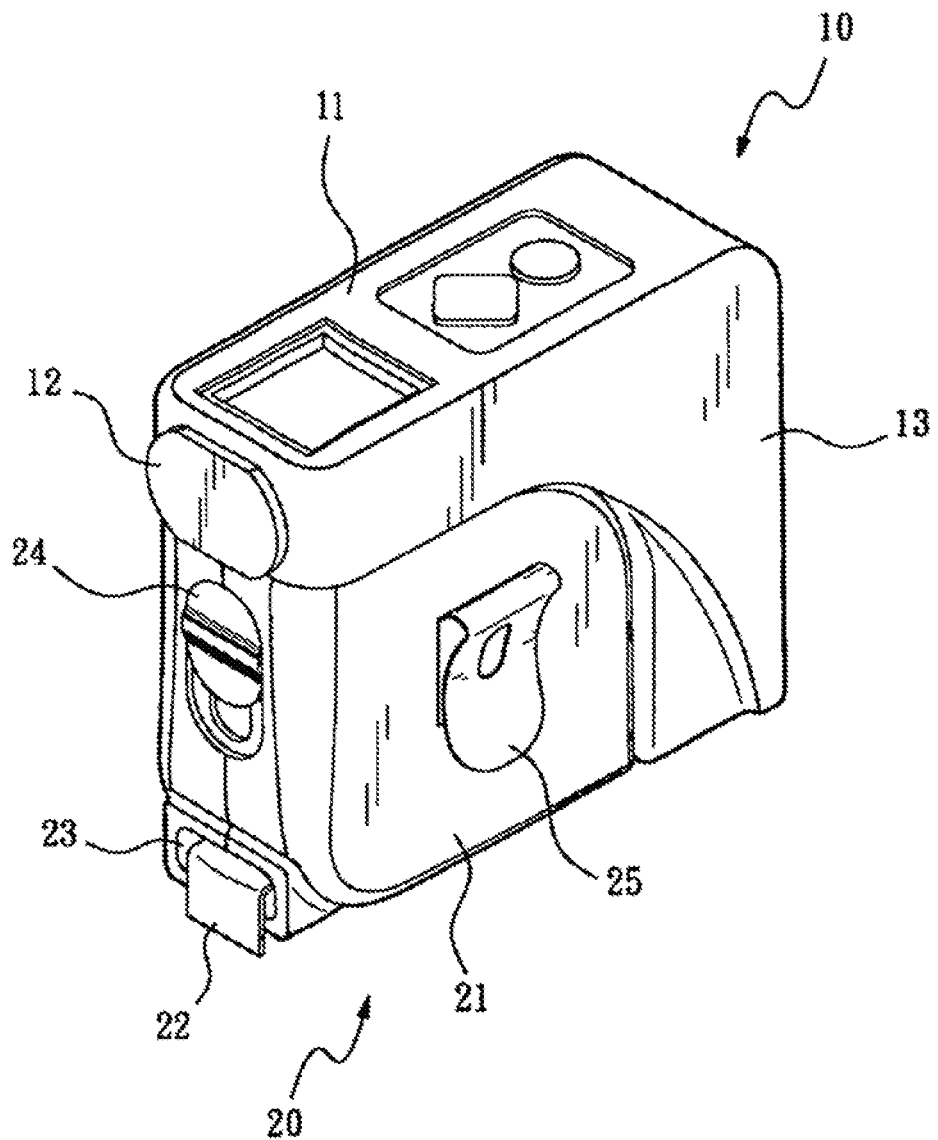
FIG. 1 is a perspective view of the dual measuring device.
Figure 6:
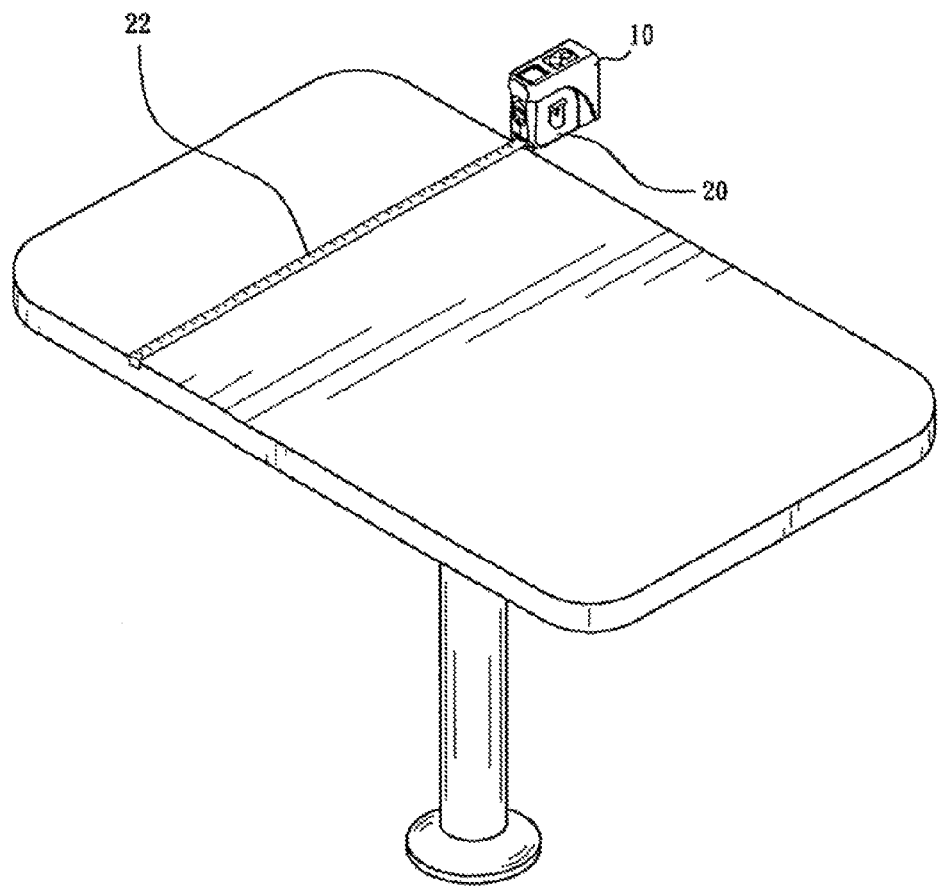
FIG. 6 illustrates another situation where the tape measure of the dual measuring device is in use.

Referring to FIG. 2, the tape measure 20 has a housing 21 and a flexible measuring tape 22 enclosed in the housing 21. The housing 21 defines a tape outlet opening 23 from which the measuring tape 22 is movable from a retracted position (FIG. 2) to an extended position (FIG. 6). When the tape measure 20 is attached to the laser rangefinder 10, as shown in FIG. 1, the muzzle 12 of the laser rangefinder 10 and the tape outlet opening 23 of the tape measure 20 are directed in the same direction. Moreover, the tape measure further includes a sliding button 24 on a side of the housing 21 and a clip 25 on another plane side of the housing 21. The sliding button 24 is operable to stop the measuring tape 22 from movement. The clip 25 is provided to allow a user to attach the tape measure 20 to a belt or the like.

Referring to FIGS. 2 and 3, the connecting assembly 30 is disposed at the junction between the laser rangefinder 10 and the tape measure 20 to have the laser rangefinder 10 and the tape measure 20 be mounted together in a detachable way. The connecting assembly 30 includes a groove 32 defined in a top surface of the housing 21 of the tape measure 20 and a rail 31 formed on a bottom surface of the horizontal section 11 of the casing of the laser rangefinder 10. The rail 31 is constructed to be engaged in the groove 32 in the housing 21 of the tape measure 20 so that the laser rangefinder 10 and the tape measure 20 can be assembled or disassembled easily. Specifically, the rail 31 of the connecting assembly 30 has an inverted-T cross section, and the groove 32 in the housing 21 of the tape measure 20 corresponds in shape to the rail 31. Preferably, the connecting assembly 30 further includes an engaging member 321, such as a flexure strip. The engaging member 321 is secured in the groove 32 in the housing 21 of the tape measure 20 and is removably engaged in a recess 311 defined in a bottom of the rail 31, as shown in FIG. 3. In this way, the tape measure 20 may be retained in the space defined by the laser rangefinder 10. In this embodiment, the engaging member 321 is partially disposed in the groove 32 in the housing 21 of the tape measure 20.

To detach the tape measure 20 from the laser rangefinder 10, one will need to pull the tape measure 20 along the rail 31 away from the laser rangefinder 10. It should be noted that the force applied onto the tape measure 20 must be larger than a bonding force between the engaging member 321 and the recess 311 in the rail 11 in order to release the tape measure 20 from the laser rangefinder 10.

Referring back to FIG. 1, the tape measure 20 and the laser rangefinder 10 are integrated in one piece, and the muzzle 12 of the laser rangefinder 10 and the tape outlet opening 23 of the tape measure 20 are directed in the same direction. In such a fashion, a user can selectively measure a long distance with the laser rangefinder 10, as shown in FIG. 5, and measure a short distance with the tape measure 20, as shown in FIG. 6, without the need to separate one from another. However, the tape measure 20 and the laser rangefinder 10 can be detached from one another for other purposes. For example, if the tape measure 20 is broken or cannot function well, the old tape measure 20 can be easily detached from the laser rangefinder 10 and replaced by a new one.

It is to be understood that the disclosed embodiments are illustrative in nature and the invention is not to be limited to any one or more embodiments except as set forth in the following claims.

What is claimed is:

1. A measuring device comprising:
   a laser rangefinder configured to transmit a light pulse to a target and receive a reflected light pulse from the target for measuring the distance between the rangefinder and the target, the laser rangefinder having a horizontal section and a vertical section extending from the horizontal section, a space defined by the horizontal section and the vertical section of the casing of the laser rangefinder, the horizontal section having a muzzle from which the light pulse of the laser rangefinder is transmitted out; the vertical section having a battery receptacle therein for reception of a battery;
   a retractable tape measure having a housing and a flexible measuring tape enclosed in the housing; the housing defining a tape outlet opening from which the measuring tape is movable from a retracted position to an extended position; and
   a connecting assembly detachably connecting the tape measure to the laser rangefinder, when the laser rangefinder and the tape measure are mounted together, the tape measure being detachably fitted in the space to form a rectangular/square combination, and the muzzle of the laser rangefinder and the tape outlet opening of the tape measure are directed in the same direction, the connecting assembly including a groove defined in a top surface of the housing of the tape measure, a rail formed on a bottom surface of the laser rangefinder, the rail engaged with the groove in the housing of the tape measure to have the laser rangefinder and the tape measure engaged together, the rail of the connecting assembly having a recess therein, an engaging member secured in the groove in the housing of the tape measure, the engaging member being engaged in the recess in the rail.

2. The measuring device of claim 1, wherein the rail of the connecting assembly has an inverted-T cross section, and the groove corresponds in shape to the rail.

3. The measuring device of claim 1, wherein the engaging member of the connecting is a flexure strip partially disposed in the groove in the housing of the tape measure.

4. The measuring device of claim 1, wherein the tape measure further includes a sliding button disposed on a side of the housing and operable to stop the measuring tape from movement.

5. The measuring device of claim 1, wherein the tape measure further includes a clip on a plane side of the housing to allow a user to attach the tape measure to an object.

* * * * *